United States Patent
Zartman et al.

(10) Patent No.: US 10,645,900 B2
(45) Date of Patent: May 12, 2020

(54) INTEGRALLY MANUFACTURED STALL DIVIDERS FOR BARNS (71) Applicants: Thomas L. Zartman, Ephrata, PA (US); Thomas L. Zartman, Jr., Ephrata, PA (US)

(72) Inventors: Thomas L. Zartman, Ephrata, PA (US); Thomas L. Zartman, Jr., Ephrata, PA (US)

(*) Notice: Subject to any disclaimer, the term of this patent is extended or adjusted under 35 U.S.C. 154(b) by 295 days.

(21) Appl. No.: 15/614,829

(22) Filed: Jun. 6, 2017

(65) Prior Publication Data
US 2017/0359997 A1 Dec. 21, 2017

Related U.S. Application Data (60) Provisional application No. 62/350,857, filed on Jun. 16, 2016.

(51) Int. Cl.
A01K 1/00 (2006.01)

(52) U.S. Cl.
CPC .......... *A01K 1/0029* (2013.01); *A01K 1/0011* (2013.01); *A01K 1/0088* (2013.01); *A01K 1/0005* (2013.01)

(58) Field of Classification Search
CPC .. A01K 1/0029; A01K 1/0088; A01K 1/0011; A01K 1/005; Y10T 403/5753
USPC .......................... 119/516, 520, 522, 523, 521
See application file for complete search history.

(56) References Cited

U.S. PATENT DOCUMENTS

| 4,386,870 | A | * | 6/1983 | Baroody | F16B 7/18 403/234 |
|---|---|---|---|---|---|
| 5,975,026 | A | * | 11/1999 | Rudolph | A01K 1/0011 119/523 |
| 6,318,297 | B1 | * | 11/2001 | Hatfield | A01K 1/0011 119/516 |
| 6,467,434 | B1 | * | 10/2002 | Dejonge | A01K 1/0011 119/516 |
| 2005/0263092 | A1 | * | 12/2005 | Moreau | A01K 1/0011 119/516 |
| 2007/0006817 | A1 | * | 1/2007 | Komro | A01K 1/0011 119/523 |
| 2012/0234257 | A1 | * | 9/2012 | Wollesen | A01K 1/0011 119/523 |
| 2014/0109840 | A1 | * | 4/2014 | Wilson | A01K 1/0011 119/523 |
| 2015/0164037 | A1 | | 6/2015 | Earle | |

(Continued)

*Primary Examiner* — Trinh T Nguyen
(74) *Attorney, Agent, or Firm* — Miller Law Group, PLLC (57) ABSTRACT A hollow polymer stall divider for use in a barn permits lateral flexing when a cow presses against the stall divider while the stall divider asserts a lateral force against the cow to urge the cow to move into a proper position between adjacent stall dividers without causing injury to the cow. The polymer stall divider can be formed of a single polymer material having a unitary density throughout. Alternatively, the polymer stall divider can be formed of multiple sections of different densities of polymer material, and different types of polymer material. The different sections of polymer material can be plastic welded together or connected by plug members inserted into the adjoining ends of the sections and secured with adhesives or other bonding material to form line blanks that can be heated until softened sufficiently to be bent into a proper shape within a pre-formed mold.

13 Claims, 6 Drawing Sheets (56) References Cited

U.S. PATENT DOCUMENTS

2017/0280670 A1* 10/2017 Johanningmeier .. A01K 1/0005
2018/0184613 A1* 7/2018 Zartman .............. A01K 1/0011

* cited by examiner

INTEGRALLY MANUFACTURED STALL DIVIDERS FOR BARNS

CROSS-REFERENCE TO RELATED APPLICATIONS

This application claims domestic priority on U.S. Provisional Patent Application Ser. No. 62/350,857, filed on Jun. 16, 2016, and entitled "Integrally Manufactured Stall Dividers for Barns", the content of which is incorporated herein by reference.

FIELD OF THE INVENTION

This invention relates generally to stall dividers for use in a barn to separate animals, and more particularly, to an integrally formed polymer stall divider for separating dairy cattle in a barn.

BACKGROUND OF THE INVENTION

Conventional stall dividers are formed from metal, usually steel, and are positioned between animals, particularly dairy cows, to encourage the cows to lie down and rest without hurting themselves or the neighboring animals. Stall dividers are placed at predetermined spaced intervals along a row to separate the resting cattle. In free stall situations, the cows are allowed to enter the divided area of the barn and select a stall in which the cows walk into the stall head first. In free stall systems, the cows are not tied to the stall structure and are generally able to move out of the stall, but the stall dividers encourage the cows to lie down and rest. Generally, cattle are placed in stalls that are immediately adjacent one another with the head of one cow being located proximate to the head of the corresponding cow in the adjacent row of stalls. In free stall systems, the cows are milked and fed at a separate location. With ventilation provided to the free stall area, the cows are comfortable and content.

A different situation is a tie stall system in which the cows are placed in their stalls and tied to a tie bar to keep the cows in their stalls. Typically, tie stall systems have a significant space between the rows of stalls into which feed is positioned in front of each cow. Usually, the cows are milked while present in the tie stall system, and sometimes released afterward to move to a pasture or another area of the barn, or at other times the cows are retained in the tie stall system and encouraged to lie down and rest. In either the free stall or tie stall systems, stall dividers are used to separate the cows from the neighboring cows.

Stall dividers can be shaped in many different forms to conform to the preferences of the owner of the cattle. Some of those different shapes are reflected in FIGS. 8-13 and in FIG. 4. Irrespective of whether the barn utilizes tie stalls or free stalls, the stalls have a divider between them to keep the cows separated, and to keep cool. The particular shapes of the dividers are a matter of choice.

In U.S. patent application Ser. No. 14/568,504, filed on Dec. 12, 2014, by Michael Earle and published as U. S. Patent Publication No. 2015/0164037 on Jun. 18, 2015, a different type of stall divider is disclosed. In this Earle patent application, the stall dividers are manufactured from two different materials, including two horizontally-extending, and converging linear members made from a plastic material, i.e. polypropylene random copolymer, which are connected by curved flexible member made from rubber and joined to the distal ends of the two horizontally-extending members to create the stall divider. The curved rubber end member in this Earle patent application is significantly more flexible than the polymer horizontally-extending members to minimize injury to the cows entering the stall, and perhaps impacting the stall dividers.

It would be desirable to provide a stall divider that does not require the utilization of a rubber curved end member, yet allows for flexibility in the stall divider to prevent cows from being injured when running into the stall divider.

SUMMARY OF THE INVENTION

It is an object of this invention to overcome the disadvantages of the prior art by forming stall dividers from hollow flexible polymer tubing.

It is another object of this invention to provide a flexible polymer stall divider that can flex laterally if the animal presses against the stall divider.

It is a feature of this invention that the ability for the stall divider to flex laterally minimizes injury to the cow pressing against the stall divider.

It is an advantage of this invention that the flexed polymer stall divider will assert a lateral force against the cow to urge the cow to move into a proper position between the stall dividers.

It is another advantage of this invention that the polymer stall divider will return to its original position after the cow has moved into a proper position between the adjacent stall dividers.

It is another feature of this invention that the polymer stall divider can be formed in a monolithic manner with the same polymer material and same density.

It is still another feature of this invention that multiple densities of the polymer material can be utilized at different locations of the stall divider.

It is another advantage of this invention that the medium density polymer material can provide both durability and flexibility when impacted by a cow.

It is still another advantage of this invention that high density polymer material can be used to enhance durability at the expense of flexibility in the stall divider.

It is yet another feature of this invention that the curved end member of the stall divider can be formed from a polymer material that has lower density that the remaining portions of the stall divider.

It is yet another advantage of this invention that the curved end member of the stall divider having a lower density than the remaining portions of the stall divider will have a greater degree of flexibility than the rest of the stall divider structure.

It is still another object of this invention that the polymer stall dividers can be manufactured by heating the polymer material until softened sufficiently to bend in a mold into the desired shape for the stall divider.

It is another feature of this invention that the base end of the stall divider can be formed of a high density polymer while the distal portion of the elongated members can be formed from a medium density polymer and then the curved end members can be formed from a low density version of the polymer material.

It is still another feature of this invention that different polymer materials can be utilized in the construction of a polymer stall divider to maximize the desirable properties of the stall divider so long as the respective sections of polymer material can be joined together in some manner to create an integral stall divider structure.

It is an object of this invention to provide a method of manufacturing polymer stall dividers, particularly when utilizing different densities or types of polymer material.

It is a feature of this invention that the respective sections of stall dividers are connected by inserting plug members into the adjoining hollow ends of the respective sections of polymer material and then joining the respective sections of polymer material to the plug member, such as by adhesives.

It is another advantage of this invention that the respective sections of polymer material can be plastic welded to create a line blank to be softened and formed into a mold.

It is still another feature of this invention that the formed line blank of polymer material formed of different densities or types of polymer material can then be heated until softened sufficiently to be bent into the desired shape within a pre-formed mold.

It is a further object of this invention to provide a hollow polymer stall divider made from one or more densities or types of polymer material, which is durable in construction, inexpensive of manufacture, carefree of maintenance, facile in assemblage, and simple and effective in use.

These and other objects, features and advantages are accomplished according to the instant invention by providing a polymer stall divider for a barn that will permit lateral flexing when a cow presses against the stall divider while the stall divider asserts a lateral force against the cow to urge the cow to move into a proper position between adjacent stall dividers without causing injury to the cow. The polymer stall divider can be formed of a single polymer material having a unitary density throughout. Alternatively, the polymer stall divider can be formed of multiple sections of different densities of polymer material, and different types of polymer material. The different sections of polymer material can be plastic welded together or connected by plug members inserted into the adjoining ends of the sections and secured with adhesives or other bonding material to form line blanks that can be heated until softened sufficiently to be bent into a proper shape within a pre-formed mold.

BRIEF DESCRIPTION OF THE DRAWINGS

The advantages of this invention will become apparent upon consideration of the following detailed disclosure of the invention, especially when taken in conjunction with the accompanying drawings wherein.

DETAILED DESCRIPTION OF THE INVENTION

Referring now to the drawings, a stall divider for use in either tie stall or free stall barns configurations, incorporating the principles of the instant invention, can best be seen. One skilled in the art will understand that the principles of the instant invention are not limited to a particular shape or size of stall divider, nor to the specific polymer material used to manufacture the stall dividers.

Stall dividers 10 are mounted to support structure 5 at the base end 11 of the stall divider 10 in a parallel array to define stalls 8 therebetween. Cows entering the barn 1 find their way into a selected or designated stall 8 between opposing stall dividers 10. In tie stall barns, the cows are tied to a structural member (not shown) and then given feed and milked while within the stall. Cows in tie stall barns are often released after then are finished eating and being milked so that they can find their way to a cool location to lie down. Alternatively, cows in tie stall barns are retained in the stalls for extended periods while tunnel ventilation is utilized to keep them comfortable. In free stall barns, the cows are simply allowed to enter a selected or designated stall where the cow is encouraged to lie down and be cooled by air currents flowing through the barn. In either configuration, cows will sometimes run into the stall dividers, which impact the sides of the cows and cause major or minor injury. Injuries are to be avoided to enhance milk production. Thus, when a cow impacts into a steel stall divider, injury is likely because steel dividers do not yield or give way to the cow.

By forming the stall dividers 10 from hollow flexible polymer tubing, the flexibility of the polymer tubing allows the stall divider 10 to flex laterally and minimize injury to the cow, while asserting a lateral force to the side of the cow to urge the cow into the proper location between the stall dividers 10. This flexible polymer can be one of several plastic materials, including polypropylene, polyurethane and polyethylene. Each of these polymer materials can be formed in different densities, where the higher the density of the polymer, the less flexible the polymer is. For the purposes of manufacturing stall dividers, each of these materials comes in a high density (HD), medium density (MD) and low density (LD) configurations. High density material would have a density in the range of 0.941 to 0.955 g/cc, while medium density material would have a density in the range of 0.926 to 0.940 g/cc and low density material would have a density in the range of 0.010 to 0.925 g/cc.

All three density configurations can be utilized in the manufacture of an improved stall divider configuration, as will be described in greater detail below. In the monolithic stall divider configuration depicted in FIG. 4, the entire stall divider 10, including the upper or first horizontal member 15, the lower, or second horizontal member 17 and the curved end member 19 are all formed from the same material and same density. Preferably, the medium density polymer is utilized to provide both durability and flexibility when impacted by a cow. Alternatively, the high density configuration can be used, which would enhance durability at the expense of flexibility in the stall divider 10. The stall divider 10 of FIG. 4 will flex laterally to either direction and then the stall divider will try to return to the original position, even asserting a force against the cow, as the shape retention memory of the polymer material urges the stall divider 10 back to its original formed orientation.

Figure 4:
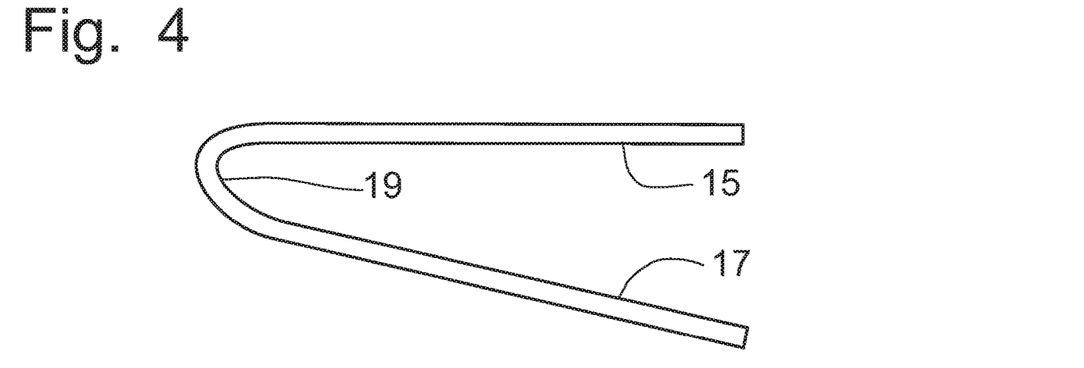
FIG. 4 is a side elevational view of a first embodiment of the stall divider incorporating the principles of the instant invention.
Figure 14:
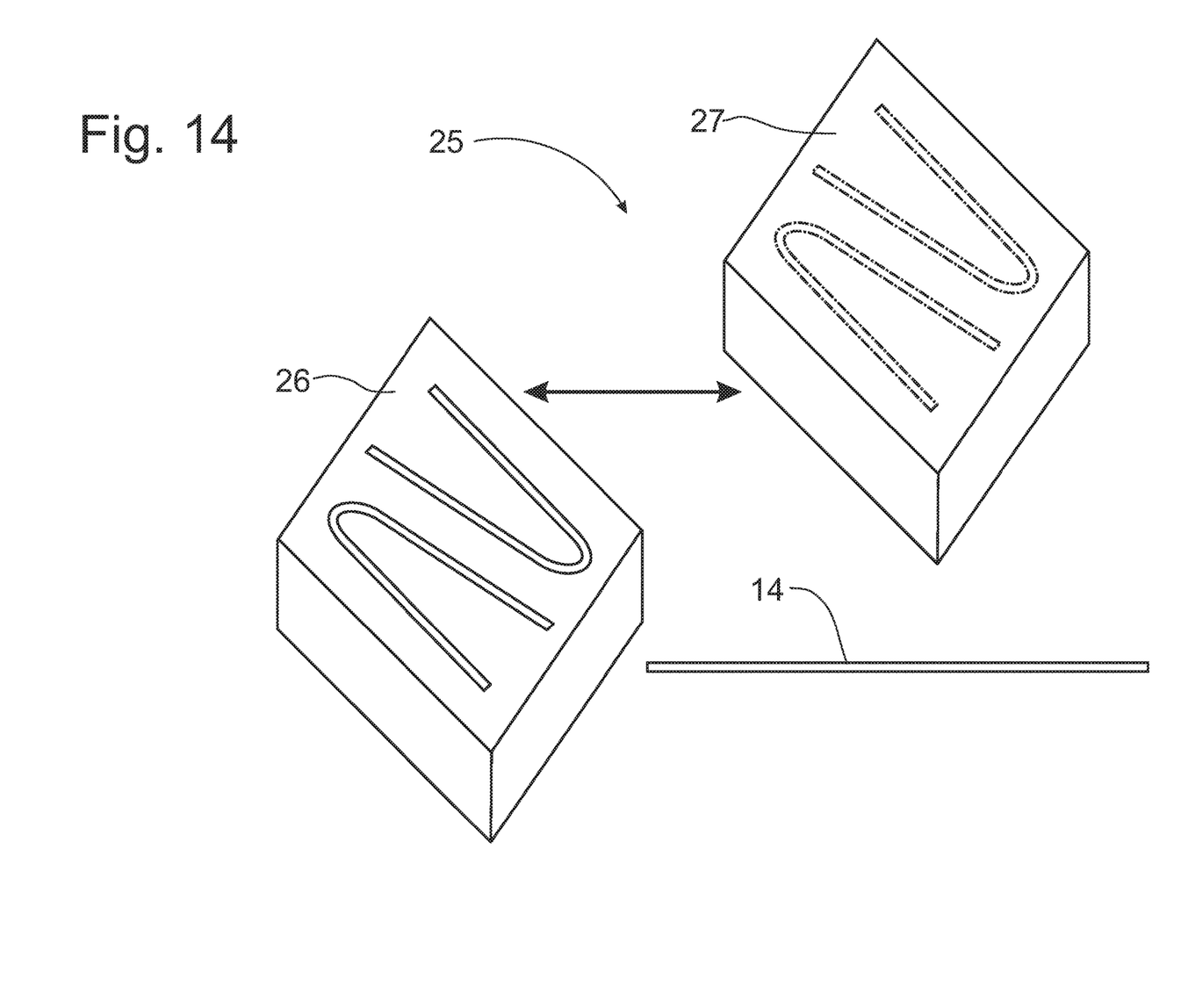
FIG. 14 is a schematic representation of a mold for shaping a formed line blank into the desired stall divider configuration.

The manner in which this monolithic stall divider 10 of FIG. 4 can be manufactured is by softening through heating a selected length of hollow tubing formed from a flexible polymer so that the length of hollow tubing, i.e. a line blank 14, can be placed into a form 25, as depicted in FIG. 14, and shaped into the desired stall divider shape. This selected length of hollow polymer tubing is preferably formed of high or medium density polyethylene and being two to three inches in diameter with wall thickness of 0.10 to 0.50 inches, although other configurations of hollow polymer tubing is also effective. The selected length is chosen to fill the die 26 from one end to the other, after which the mating half of the die 27 is secured so that the stall divider is maintained in the proper shape and then cooled.

Figure 1:
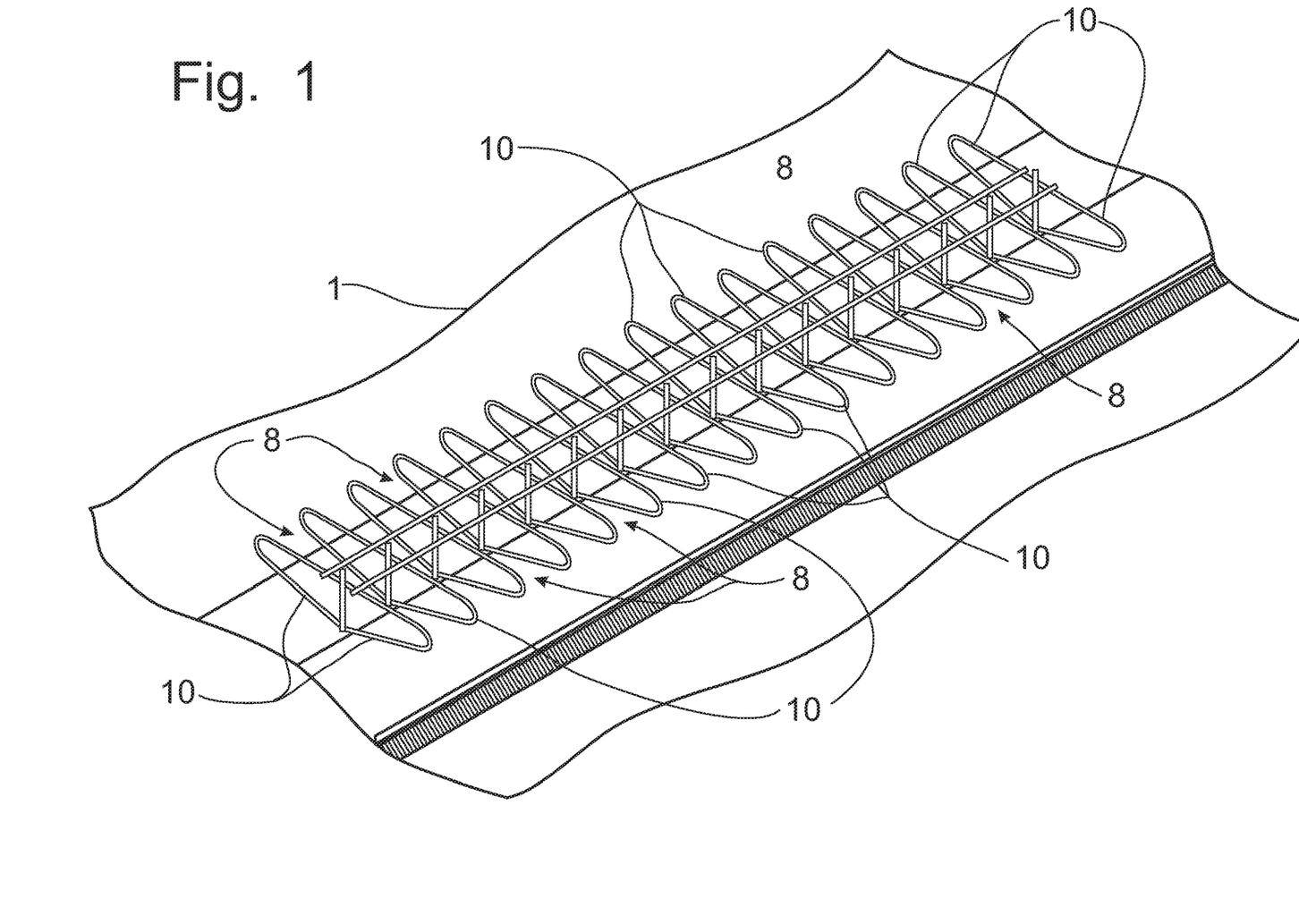
FIG. 1 is a schematic diagram of a portion of a free stall showing a plurality of parallel stall dividers incorporating the principles of the instant invention to define the respective stalls for the placement of cattle therein.
Figure 2:
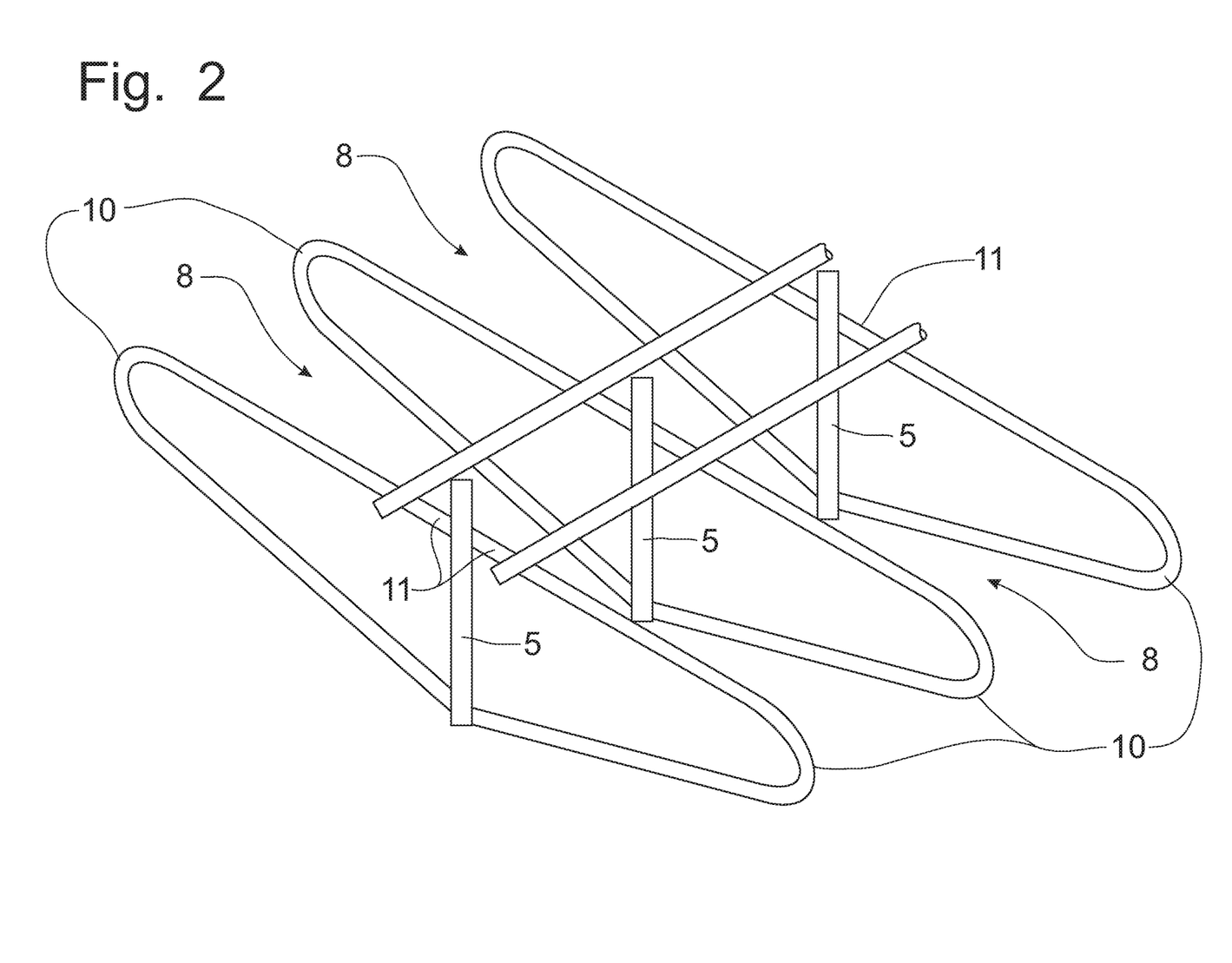
FIG. 2 is an enlarged schematic diagram of a portion of the free stall barn shown in FIG. 1.
Figure 3:
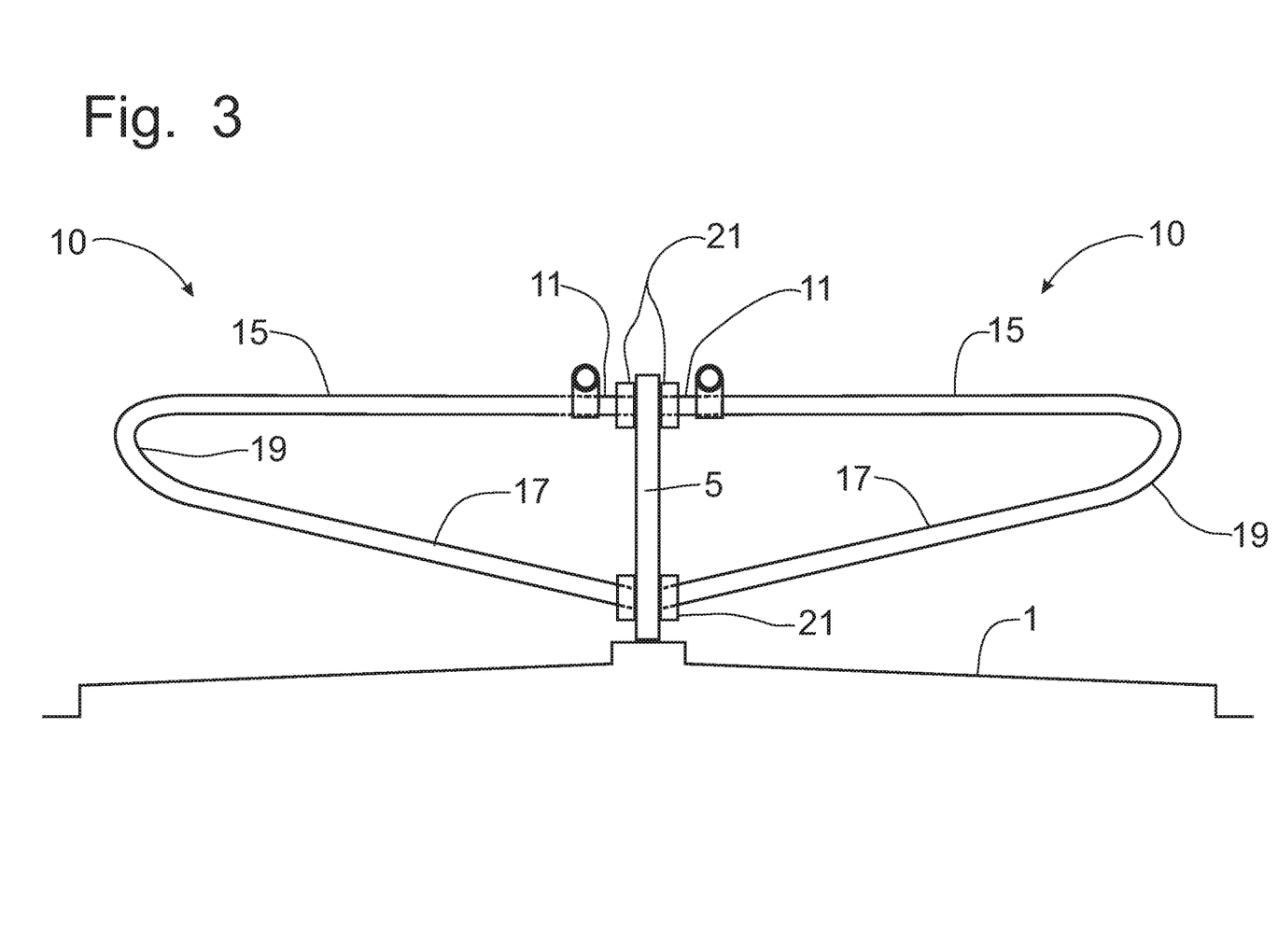
FIG. 3 is a side elevational view of the free stall configuration shown in FIG. 2.

As is depicted in FIG. 3, the stall divider 10 is preferably connected to the support structure 5, which can be a metal, steel riser, or the structure 5 may also be formed of polymer tubing, by connecting brackets 21 supported on the structure 5 and preferably connected to the elongated members 15, 17 by fasteners (not shown). Thus, the base ends 11 of the upper and lower elongated members are secured to the support structure 5 and extend outwardly therefrom in a cantilevered manner. With an impact from a cow moving into the stall 8, the polymer stall divider 10 will bend laterally while the base ends 11 remain secured to the support structure 5.

Figure 5:
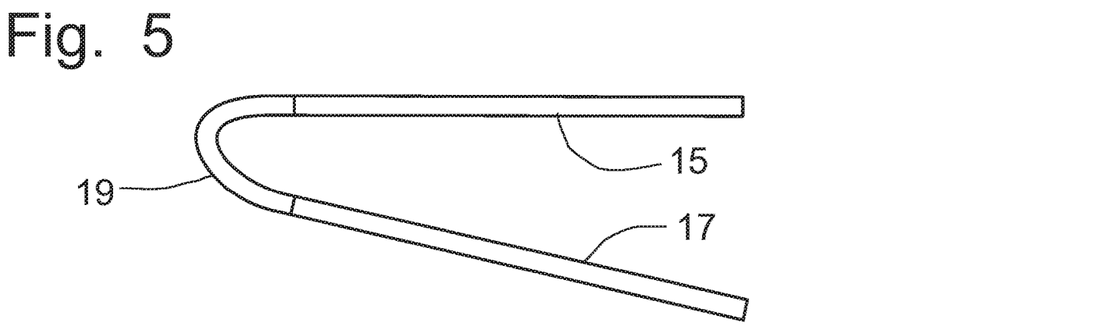
FIG. 5 is a side elevational view of a second embodiment of the stall divider.
Figure 6:
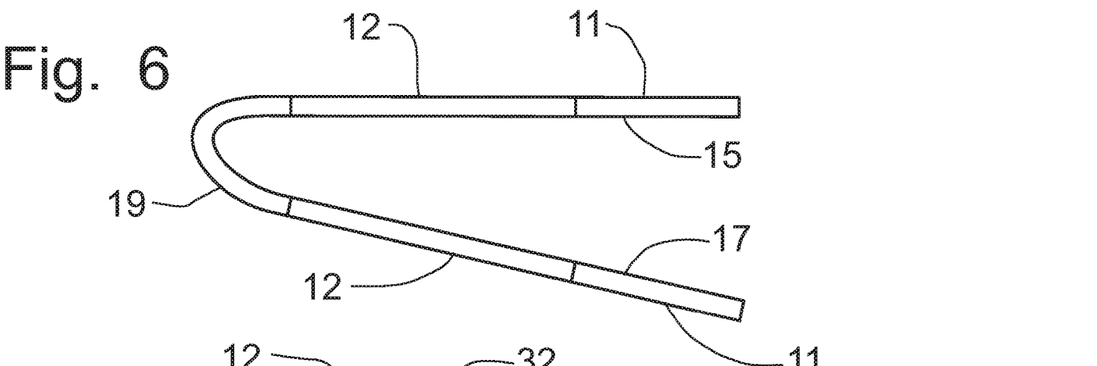
FIG. 6 is a side elevational view of a third embodiment of the instant invention.

The above-described method of forming the stall divider 10 from polymeric material by heating the polymer tubing until soft enough to bend into shape within the die can also be utilized to create multi-density stall dividers 10. As shown in FIGS. 5 and 6, the curved end member 19 can be formed from a polymer that has a lower density that the remaining portions of the stall divider 10. In this manner, the curved end member 19 will have a greater degree of flexibility than the rest of the stall divider structure 15, 17. As depicted in FIG. 6, the upper and/or lower elongated members 15, 17 can also be formed from the polymer material having different densities to enhance the flexibility and bending capability of the stall divider 10 when impacted by a cow.

Looking first at FIG. 6, the base end 11 can be formed of a high density polymer to provide a somewhat rigid mounting structure for connecting to the riser 5, but the distal portion 12 of the elongated members can be formed from a medium density form of the polymer to enhance flexibility in the elongated members 15, 17, and then the curved end members 19 can be formed from a low density version of the polymer material to further minimize the possibility of injury to a cow impacting the end of the stall divider 10. Alternatively, as depicted in FIG. 5, the entire elongated members 15, 17 can be formed from a high or medium density polymer, while the curved end member 19 is formed from a lower density version of the polymer than the elongated member 15, 17. Preferably, the same polymeric material is used throughout the stall divider 10 structure, with only the density changing from one portion to the other. However, different polymer materials can be used from one section to the other to maximize the desirable properties of the stall divider 10, as long as the respective sections of polymer can be joined together in some manner to create an integral stall divider structure.

The respective sections of the stall divider 10 can be combined to create a line blank 14 by selecting appropriate lengths of the respective densities of polymeric tubing material and plastic welding the tubing together to create the line blank 14. The line blank 14 is then heated, as previously noted, until soft enough to shape into the die 26 to form the desired stall divider configuration. Accordingly, in the embodiment shown in FIG. 5, a first length of a first density polymer tubing corresponding to the linear length of the upper elongated member 15 is plastic welded to the end of a second length of a second density polymer tubing corresponding to the linear length of the curved end member 19. The remaining end of the second length of polymer tubing is then plastic welded to a third length of the first density polymer tubing corresponding to the length of the lower elongated member 17 to form the line blank 14. Once heated, the softened line blank 14 can be inserted into the die 26 into the shape of the desired stall divider 10 and covered by the mating die 27 until cooled and extracted.

Similarly, the line blank 14 for the configuration depicted in FIG. 6 can also be formed starting with a first length of a high density polymer tubing plastic welded to the end of a second length of a medium density polymer tubing, which is then plastic welded to a third length of low density polymer tubing. A fourth length of medium density polymer tubing is then welded to the free end of the third length, followed by a fifth length of high density polymer tubing plastic welded to the free end of the fourth length. The multi-density line blank 14 is then ready for heating and shaping into the desired stall divider configuration.

Figure 7:
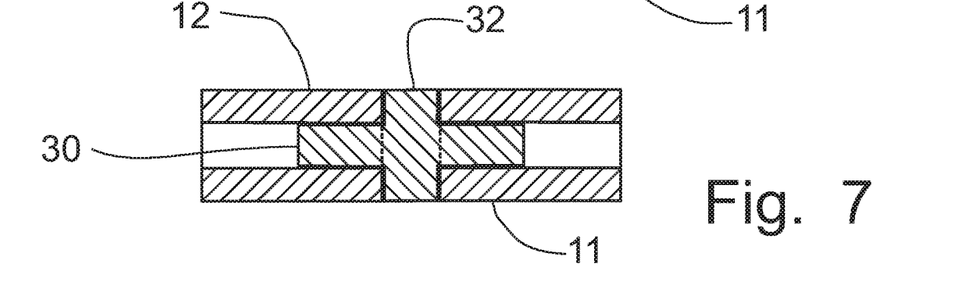
FIG. 7 is an enlarged diagrammatic cross-sectional view of an optional connector that can be utilized in the second and third embodiments of the instant invention as depicted in FIGS. 5 and 6.
Figure 8:
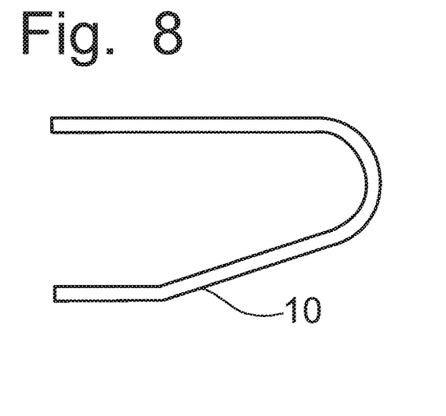
FIGS. 8-13 are side elevational view of various configurations of stall dividers that can be constructed in accordance with the principles of the instant invention.
Figure 9:
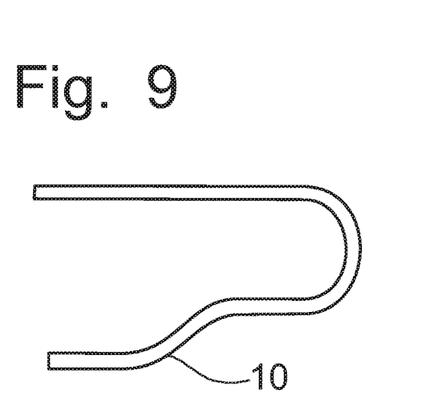
Figure 10:
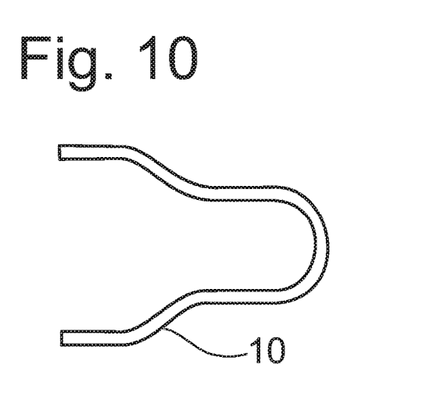
Figure 11:
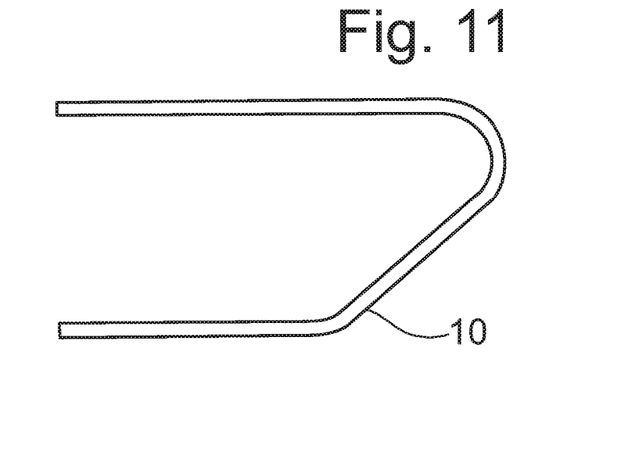
Figure 12:
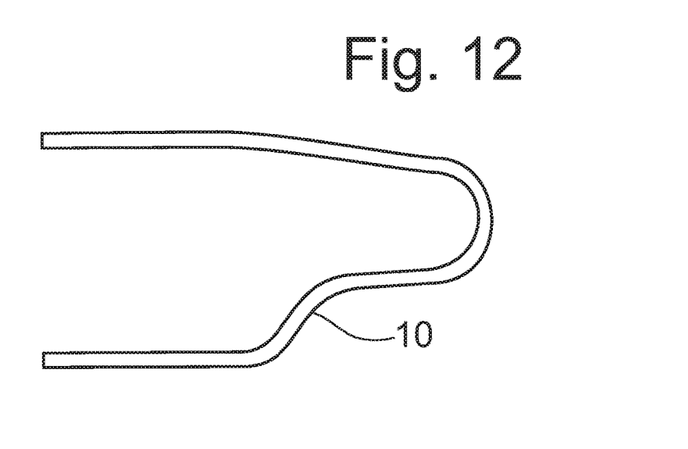
Figure 13:
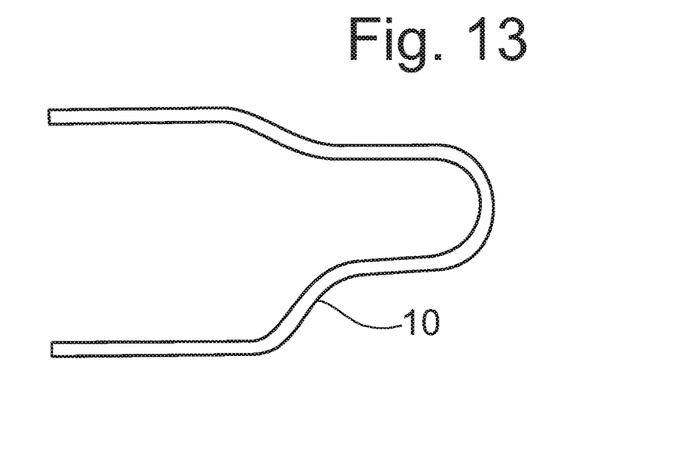

FIG. 7 depicts an optional plug member 30 that can be used to connect respective lengths of polymer tubing in the formation of the line blank 14. The plug member 30 is shaped and sized to fit into the hollow opening through the respective tubing members with a central portion 32 having an external diameter equal to the diameter of the polymer tubing. Thus, when the plug member 30 is inserted to connect two lengths of polymer tubing, the exterior surface looks substantially seamless. Preferably, the plug member 30 is secured to the opposing lengths of tubing with adhesives that are heat resistant and allow the formation of the line blank 14 into the die 26. The plug member 30 is preferably a low density type of the same polymeric material from which the opposing lengths of tubing 11, 12 are constructed; however, the plug member could be formed from a more flexible material like rubber. Instead of plastic welding, the respective sections of the line blank 14 formed of different densities of polymer tubing are joined together by adhesives securing the plug member 30 to the respective lengths of tubing 11, 12.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:
1. A stall divider, comprising:
   a first generally horizontal, elongated member formed from a flexible polymer;
   a second generally horizontal, elongated member formed from said flexible polymer and being oriented in a vertical plane with said first elongated member, each of said first and second elongated members are formed from two densities of said flexible polymer, each of said first and second elongated members having a base portion and a distal portion, each said base portion having a density that is greater than the corresponding distal portion, each of said corresponding base and distal portions being plastic welded together to form respective integral said first and second members; and a curved member formed from said flexible polymer, said curved member being connected to the respective said distal portions of said first and second elongated members.

2. The stall divider of claim 1 wherein said first and second elongated members are oriented in a converging manner toward said curved member such that said curved member is curved through an arc of less than 180 degrees.

3. The stall divider of claim 1 wherein said first and second elongated members are formed from the same flexible polymer material having a first density, said curved member being formed from the same flexible polymer material but have a second density less than said first density, whereby said curved member is more flexible than said first and second elongated members.

4. The stall divider of claim 3 wherein said first and second elongated members are respectively plastic welded to said curved member to make the first and second elongated members integral with said curved member.

5. The stall divider of claim 3 wherein said curved member is affixed to said first and second elongated members by a flexible plug formed from a low density flexible polymer material and secured by adhesives to said first and second elongated members.

6. The stall divider of claim 5 wherein said curved member is affixed to said first and second elongated members by a flexible plug formed from rubber and secured between said curved member and said first and second elongated members by fasteners, including at least one of bolts, screws and adhesive.

7. The stall divider of claim 1 wherein said curved member is formed from said flexible polymer having a density less than the density of said adjacent distal portions of said first and second elongated members.

8. A stall divider, comprising:
a first generally horizontal, elongated member formed from a first flexible polymer material;
a second generally horizontal, elongated member formed from said first flexible polymer material and being oriented in a vertical plane with said first elongated member; and
a curved member formed from a second flexible polymer material and being integrally formed with said first and second elongated members to form said stall divider, said first and second flexible polymer materials differ only by density with said first flexible polymer material having a higher density than said second flexible polymer material.

9. The stall divider of claim 8 wherein each of said first and second elongated members have a base portion and a distal portion connected to said curved member, said base portion having a greater density than said distal portion and said distal portions of said first and second elongated members having a greater density than said curved member.

10. A stall divider, comprising:
a first generally horizontal, elongated member formed from a flexible polymer;
a second generally horizontal, elongated member formed from said flexible polymer and being oriented in a vertical plane with said first elongated member; and
a curved member formed from said flexible polymer, said first and second elongated members being formed from the same flexible polymer material having a first density, said curved member being formed from the same flexible polymer material as said first and second elongated members but have a second density less than said first density, whereby said curved member is more flexible than said first and second elongated members, said curved member being integrally formed with said first and second elongated members to form said stall divider.

11. The stall divider of claim 10 wherein said first and second elongated members are respectively plastic welded to said curved member to make the first and second elongated members integral with said curved member.

12. The stall divider of claim 10 wherein said curved member is affixed to said first and second elongated members by a flexible plug and secured by adhesives to said first and second elongated members.

13. The stall divider of claim 10 wherein said curved member is affixed to said first and second elongated members by a flexible plug formed from rubber and secured between said curved member and said first and second elongated members by fasteners, including at least one of bolts, screws and adhesive.

* * * * *